(12) United States Patent
Yoo et al.

(10) Patent No.: US 10,227,514 B2
(45) Date of Patent: *Mar. 12, 2019

(54) ADHESIVE FILM

(71) Applicant: LG CHEM, LTD., Seoul (KR)

(72) Inventors: Hyun Jee Yoo, Daejeon (KR); Yoon Gyung Cho, Daejeon (KR); Suk Ky Chang, Daejeon (KR); Jung Sup Shim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 216 days.

This patent is subject to a terminal disclaimer.

(21) Appl. No.: 13/899,386

(22) Filed: May 21, 2013

(65) Prior Publication Data
US 2013/0251989 A1 Sep. 26, 2013

Related U.S. Application Data

(63) Continuation of application No. PCT/KR2011/008992, filed on Nov. 23, 2011.

(30) Foreign Application Priority Data

Nov. 23, 2010 (KR) .................. 10-2010-0116705
Nov. 23, 2011 (KR) .................. 10-2011-0123152

(51) Int. Cl.
*H05B 33/10* (2006.01)
*C09J 163/00* (2006.01)
(Continued)

(52) U.S. Cl.
CPC .............. *C09J 163/00* (2013.01); *C09J 7/10* (2018.01); *C09J 9/00* (2013.01); *C09J 11/04* (2013.01);
(Continued)

(58) Field of Classification Search
None
See application file for complete search history.

(56) References Cited

U.S. PATENT DOCUMENTS 5,807,910 A * 9/1998 Tseng ............... C09J 163/00
523/428
5,827,908 A * 10/1998 Arai et al. ............... 523/212
(Continued)

FOREIGN PATENT DOCUMENTS

CN 101151343 A 3/2008
EP 1804310 A2 7/2007
(Continued)

OTHER PUBLICATIONS

"Zimmertemperatur", Internet Citation, Mar. 2006, XP-002437536, Retrieved from the Internet: URL:http://www.roempp.com/prod/roempp.php [retrieved on Jun. 13, 2007].
(Continued)

*Primary Examiner* — Frank D Ducheneaux
(74) *Attorney, Agent, or Firm* — Dentons US LLP

(57) ABSTRACT

The present invention relates to an adhesive composition, an adhesive film, a method of manufacturing the adhesive film and an organic electronic device (OED) that are used to encapsulate an organic electronic element. The adhesive composition can form an encapsulant layer having an excellent adhesive property, impact resistance, heat-protecting property and moisture blocking property, so that an OED that includes an element encapsulated with the adhesive composition can exhibit an excellent lifespan property and durability.

13 Claims, 2 Drawing Sheets

(51) Int. Cl.
*C09J 9/00* (2006.01)
*C09J 11/04* (2006.01)
*C09J 7/10* (2018.01)
*C09J 133/08* (2006.01)
*C08K 3/013* (2018.01)
*C08K 3/22* (2006.01)
*C08K 3/36* (2006.01)
*C08K 3/34* (2006.01)

(52) U.S. Cl.
CPC ............ *C09J 133/08* (2013.01); *H05B 33/10* (2013.01); *C08K 3/013* (2018.01); *C08K 3/22* (2013.01); *C08K 3/346* (2013.01); *C08K 3/36* (2013.01); *C08K 2201/008* (2013.01); *C09J 2203/326* (2013.01); *C09J 2205/102* (2013.01); *C09J 2433/00* (2013.01); *C09J 2463/00* (2013.01); *Y10T 428/2848* (2015.01)

(56) References Cited

U.S. PATENT DOCUMENTS

| | | | |
|---|---|---|---|
| 6,090,468 A * | 7/2000 | Shimada | H01L 21/4857 156/300 |
| 6,226,890 B1 | 5/2001 | Boroson et al. | |
| 6,265,782 B1 * | 7/2001 | Yamamoto | C09J 163/00 257/782 |
| 6,621,154 B1 * | 9/2003 | Satoh | C08L 63/00 257/40 |
| 6,808,828 B2 | 10/2004 | Ohata | |
| 7,462,651 B2 * | 12/2008 | Cao et al. | 522/74 |
| 8,742,411 B2 * | 6/2014 | Yoo et al. | 257/40 |
| 2003/0143423 A1 * | 7/2003 | McCormick et al. | 428/690 |
| 2005/0062174 A1 | 3/2005 | Ingle et al. | |
| 2006/0006362 A1 * | 1/2006 | Miyawaki et al. | 252/299.01 |
| 2010/0129045 A1 | 5/2010 | Shibata et al. | |
| 2012/0080808 A1 * | 4/2012 | Inada | C08G 59/18 257/783 |

FOREIGN PATENT DOCUMENTS

| | | |
|---|---|---|
| EP | 2637229 A2 | 9/2013 |
| JP | 2000145627 | 5/2000 |
| JP | 2001252505 | 9/2001 |
| KR | 100587480 B1 | 5/2006 |
| TW | 200904928 | 2/2009 |
| WO | WO 9743352 A1 * | 11/1997 |

OTHER PUBLICATIONS

XP003025741: Anonymous: "Standard Test Method for Water Vapor Transmission Rate Through Plastic Film and Sheeting Using a Modulated Infrared Sensor," ASTM International Standard, ASTM International, US, Oct. 1, 2005, pp. 1-6.

* cited by examiner

ADHESIVE FILM

This application is a Continuation Bypass of International Application No. PCT/KR2011/008992, filed Nov. 23, 2011, and claims priority to and the benefit of Korean Patent Application Nos. 10-2010-0116705, filed Nov. 23, 2010, and 10-2011-0123152, filed Nov. 23, 2011, the disclosures of which is incorporated herein by reference in their entirety.

TECHNICAL FIELD

The present invention relates to an adhesive composition, an adhesive film, a method of manufacturing the adhesive film, and an organic electronic device.

BACKGROUND ART

An organic electronic device (OED) is device that includes a functional organic material. The OED, or an organic electronic element that is included in the OED may be a photovoltaic device, a rectifier, a transmitter, an organic light emitting diode (OLED), and the like, by way of example.

Generally, the OED is vulnerable to external factors, such as moisture, and the like. For example, the OLED generally includes a layer of a functional organic material that is present between a pair of electrodes including a metal or metallic oxide. Accordingly, the layer of organic material is delaminated under the influence of moisture in an interface with an electrode due to moisture penetrating from the outside or the electrode is oxidized by the moisture, thereby increasing resistance or deteriorating the organic material itself. For this reason, there are problems that the function of light emitting is lost or a luminance is deteriorated.

The following Patent documents 1 to 4 disclose a encapsulation structure for protecting an OLED from external environmental factors, such as moisture, and the like, in which for the encapsulation structure, the OLED formed on a substrate is covered with a metal can or a glass can including a moisture absorbent or getter, and then fixed with an adhesive:

(Patent document 1) U.S. Pat. No. 6,226,890;
(Patent document 2) U.S. Pat. No. 6,808,828;
(Patent document 3) Japanese Publication Patent No. 2000-145627; and
(Patent document 4) Japanese Publication Patent No. 2001-252505;

DISCLOSURE

Technical Problem

The present invention provides an adhesive composition, an adhesive film, a method of manufacturing the adhesive film, and an organic electronic device (OED).

TECHNICAL SOLUTION

The present invention relates to an adhesive composition. The adhesive composition may be used to encapsulate an OED.

The term, "an organic electronic element" may refer to an element or a device including at least one functional organic material. The organic electronic element may be a photovoltaic device, a rectifier, a transmitter, an organic light emitting diode (OLED), and the like, or a device including the same, by way of example.

The adhesive composition may include a curable adhesive resin, a moisture absorbent, and a filler. An exemplified adhesive composition may be a hot melt type. The term, "hot melt type of an adhesive composition" may refer to a type that is in a solid or semi-solid phase at room temperature, has adhesive property through melting by heating, and can tightly fix an object as an adhesive after curing. Also, the term, "curing" may refer to a chemical or physical operation or reaction to change in order for the composition to has an adhesive property. In addition, the term, "room temperature" may refer to a natural temperature without heating or cooling, and for example, may be a temperature of about 15° C. to 35° C., about 20° C. to 25° C., about 25° C., or about 23° C.

The curable adhesive resin may be the resin which has an adhesive property after curing. The curable adhesive resin may, for example, be in a solid or semi-solid phase at room temperature, and preferably, may be in a solid phase. The resin in a solid or semi-solid phase at room temperature may refer to the resin not having fluidity at room temperature. For example, the solid or semi-solid phase at room temperature for the present specification may indicate that a viscosity of the object at room temperature may be at least about $10^6$ poise or at least about $10^7$ poise. The viscosity is measured using an Advanced Rheometric Expansion System (ARES).

When the curable adhesive resin is in a solid or semi-solid phase at room temperature, an adhesive may be maintained in a film or sheet shape even in a non-cured state. For this reason, a device can be protected from physical or chemical damage in a process of sealing or encapsulating of the OED that uses the adhesive, and also the process can be smoothly performed. In addition, mixing of bubbles in a process of sealing or encapsulating the OED and deterioration of a lifespan of the device can be prevented. An upper limit of the curable adhesive resin's viscosity is not specifically limited, but for example, may be controlled within a range of about $10^9$ poise or less considering processability, and the like.

In addition, the curable adhesive resin may have a water vapor transmission rate (WVTR) of 50 g/m²·day or less, 30 g/m²·day or less, 20 g/m²·day or less, or 15 g/m²·day or less in a cured state. The WVTR may be, for example, a WVTR which is measured with respect to a thickness direction of a film shaped layer that is obtained by curing the curable adhesive resin and has a thickness of 80 µm. The WVTR may be measured under the condition where the film shaped layer is placed under the condition of 38° C. and 100% relative humidity. The WVTR may be measured according to the regulations of ASTM F1249.

In order for the curable adhesive resin to have the above-mentioned WVTR, a crosslinking structure or density may be controlled by using a type of resin to be described below or controlling the amount of a curing agent, a crosslinking agent, or an initiator. When the curable adhesive resin has the above-mentioned WVTR, an encapsulation structure of the OED can effectively prevent moisture, humidity, oxygen, and the like from penetrating. For the WVTR of the curable adhesive resin, the lower the value, the better the performance of the encapsulation structure, and thus there is no particular lower limit.

The curable adhesive resin may be a heat curable adhesive resin, an active energy ray curable adhesive resin, or a hybrid curable adhesive resin that are known in the related art. Curing for "a heat curable adhesive resin" may occur by supplying of proper heat or an aging process; curing for "an active energy ray curable adhesive resin" may occur by irradiating of active energy rays; and curing for "a hybrid curable adhesive resin" may occur by processing of curing mechanisms of the heat curable and active energy ray curable adhesive resin at the same time or in sequence. In addition, the active energy rays may be, for example, microwaves, infrared rays (IR), ultraviolet rays (UV), X rays and gamma rays, or particle beams, such as alpha-particle beams, proton beams, neutron beams, electron beams, and the like.

The curable adhesive resin may has an adhesive property after curing, for example, and may be a resin including at least one of a functional group or site that is curable by heat, such as a glycidyl group, an isocyanate group, a hydroxy group, a carboxyl group or an amide group, and the like, or at least one of a functional group or site that is curable by irradiating active energy rays, such as an epoxide group, a cyclic ether group, a sulfide group, an acetal group, a lactone group, and the like. The curable adhesive resin may be an acrylic resin, a polyester resin, an isocyanate resin, an epoxy resin, and the like including at least one of the functional group or site, by way of example, but is not limited thereto.

In an example, the curable adhesive resin may be an epoxy resin. The epoxy resin may be an aromatic or aliphatic epoxy resin. The epoxy resin may include a heat curable epoxy resin, or for example, an active energy ray curable epoxy resin cured by a cationic polymerization reaction by irradiating active energy rays.

For an epoxy resin according to an example of the present invention, an epoxy equivalent may be 150 to 1,000 g/eq, 150 to 900 g/eq, 150 to 800 g/eq, 150 to 700 g/eq, 150 to 600 g/eq, 150 to 500 g/eq, 150 to 400 g/eq or 150 to 300 g/eq. A property, such as an adhesive performance or a glass transition temperature, and the like, can be maintained within a range of the epoxy equivalent. The epoxy resin may be, for example, one or two or more of a cresol novolac epoxy resin, a bisphenol F-type epoxy resin, a bisphenol F-type novolac epoxy resin, a bisphenol A-type epoxy resin, a bisphenol A-type novolac epoxy resin, a phenol novolac epoxy resin, a tetrafunctional epoxy resin, a biphenyl-type epoxy resin, a triphenol methane-type epoxy resin, an alkyl modified triphenol methane epoxy resin, a naphthalene epoxy resin, a dicyclopentadiene-type epoxy resin or a dicyclopentadiene modified phenol-type epoxy resin, and the like.

In an example of the present invention, the epoxy resin may be an aromatic epoxy resin. The term, "aromatic epoxy resin" may refer to an epoxy resin including at least one aromatic group, such as a phenyl group, or an aromatic core, such as a phenylene structure, at a main chain or side chain of the resin. When using the aromatic epoxy resin, a cured material has excellent heat and chemical stabilities, and also a low amount of moisture absorption so that a reliability of the encapsulation structure of the OED can be improved. The aromatic epoxy resin may be, for example, one or two of more of a biphenyl-type epoxy resin, a dicyclopentadiene-type epoxy resin, a naphthalene-type epoxy resin, a dicyclopentadiene modified phenol-type epoxy resin, a cresol epoxy resin, a bisphenol epoxy resin, a xylok epoxy resin, a multifunctional epoxy resin, a phenol novolac epoxy resin, a triphenolmethane-type epoxy resin, an alkyl modified triphenolmethane epoxy resin, and the like, but is not limited thereto.

In an example, the epoxy resin may be a silane modified epoxy resin. The silane modified epoxy resin may be, for example, a reactant of a silane compound and at least one epoxy resin from the above-mentioned epoxy resins. The silane compound may be, for example, a compound represented by the following Chemical Formula 1:

$$D_nSiX_{(4-n)}$$  [Chemical Formula 1]

Wherein D is a vinyl group, an epoxy group, an amino group, an acrylic group, a methacrylic group, a mercapto group, an alkoxy group, or an isocyanate group, or an alkyl group substituted with any one of the above-mentioned functional groups;

X is hydrogen, an alkyl group, a halogen, an alkoxy group, an aryl group, an aryloxy group, an acyloxy group, an alkylthio group, or an alkyleneoxythio group; and n is a number from 1 to 3.

The functional group, "D" in the compound of Chemical Formula 1 may form a silane modified epoxy resin by reacting with a functional group that is included in the epoxy resin.

For example, when the functional group is an amino group, the amino group is reacted with the epoxy group of the epoxy resin to form a "—CH(OH)—CH$_2$—NH—" bind and introduce the silane compound into the epoxy group.

In addition, when the functional group, "D" is an isocyanate group or an alkoxy group, can also be introduced the silane compound by reacting with the epoxy resin including a hydroxy group (OH), for example, a bisphenol-type epoxy resin, such as a bisphenol F-type epoxy resin, a bisphenol F-type novolac epoxy resin, a bisphenol A-type epoxy resin, a bisphenol A-type novolac epoxy resin, and the like.

The alkyl group in Chemical Formula 1 may be, for example, a $C_1$ to $C_{20}$, $C_1$ to $C_{16}$, $C_1$ to $C_{12}$, $C_1$ to $C_8$, or $C_1$ to $C_4$ alkyl group. The alkyl group may be a straight, branched, or cyclic alkyl group.

In Chemical Formula 1, the halogen atom may be, for example, fluorine (F), chlorine (Cl), bromine (Br), iodine (I), and the like.

Also, the alkoxy group in Chemical Formula 1 may be, for example, a $C_1$ to $C_{20}$, $C_1$ to $C_{12}$, $C_1$ to $C_8$, or $C_1$ to $C_4$ alkoxy group. The alkoxy group may be straight, branched, or cyclic alkoxy group.

In addition, the aryl group, or the aryl group that is included in the aryloxy group in Chemical Formula 1 may include a so-called aralkyl group, arylalkyl group, and the like in addition to the aryl group. For example, the aryl group may refer to a compound including at least one benzene ring, or a structure that is formed by condensing or binding at least two benzene rings, or a monovalent residue derived from a derivative thereof. The aryl group may be, for example, a $C_6$ to $C_{25}$, $C_6$ to $C_{21}$, $C_6$ to $C_{18}$, or $C_6$ to $C_{12}$ aryl group. The aryl group may be, for example, a phenyl group, dichlorophenyl, chlorophenyl, a phenylethyl group, a phenylpropyl group, a benzyl group, a tolyl group, a xylyl group or a naphthyl group, and the like, and preferably, a phenyl group.

Also, the acyloxy group in Chemical Formula 1 may be, for example, a $C_1$ to $C_{20}$, $C_1$ to $C_{16}$, or $C_1$ to $C_{12}$ acyloxy group.

In addition, the alkylthio group in Chemical Formula 1 may be, for example, a $C_1$ to $C_{20}$, $C_1$ to $C_{16}$, $C_1$ to $C_{12}$, $C_1$ to $C_8$, or $C_1$ to $C_4$ alkylthio group, and the alkyloxythio group may be, for example, a $C_1$ to $C_{20}$, $C_1$ to $C_{16}$, $C_1$ to $C_{12}$, $C_1$ to $C_8$, or $C_1$ to $C_4$ alkyleneoxythio group.

The alkyl group, the alkoxy group, the aryl group, the acyloxy group, the alkylthio group, the alkyleneoxythio group, and the like may be randomly substituted with at least one substituent. The substituent may be, for example, a hydroxy group, an epoxy group, an alkyl group, an alkenyl group, an alkynyl group, an alkoxy group, an acyl group, a thiol group, an acryloyl group, a methacryloyl group, an aryl group or an isocyanate group, and the like, but is not limited thereto.

The functional group, "D" in Chemical Formula 1 may be an alkoxy group, an amino group or an isocyanate group among the functional groups above.

Also, at least one, at least two or three group among the functional groups, "X" in the Chemical Formula 1 may be, for example, a halogen atom, an alkoxy group, an aryloxy group, an acyloxy group, an alkylthio group, an alkyleneoxythio group, and the like, or may be an alkoxy group.

The silane modified epoxy resin may be, for example, an epoxy resin introduced with a silane compound of about 0.1 to about 10 parts by weight, about 0.1 to about 9 parts by weight, about 0.1 to about 8 parts by weight, about 0.1 to about 7 parts by weight, about 0.1 to about 6 parts by weight, about 0.1 to about 5 parts by weight, about 0.1 to about 4 parts by weight, about 0.1 to about 3 parts by weight, about 0.3 to 2 parts by weight, or about 0.5 to about 2 parts by weight, relative to 100 parts by weight of the epoxy resin. In an example, the epoxy resin introduced with the silane compound may be an aromatic epoxy resin. The aromatic epoxy resin may be, for example, a bisphenol-type epoxy resin, such as a bisphenol F-type epoxy resin, a bisphenol F-type novolac epoxy resin, a bisphenol A-type epoxy resin, a bisphenol A-type novolac epoxy resin, and the like.

The epoxy resin including a silyl group in the structure modified with the silane can allow an encapsulant layer of the OED to exhibit an excellent adhesive property with a substrate, and the like, an excellent moisture blocking property, excellent durability, and excellent reliability.

The adhesive composition also includes a moisture absorbent. The term, "moisture absorbent" may be used as a general meaning for all components that can absorb or remove moisture or humidity introduced from the outside through a physical or chemical reaction, or prevent the inflow of them.

The moisture absorbent may be, for example, an oxide, a metallic salt, and the like. The oxide may be, for example, a metallic oxide, such as lithium oxide ($Li_2O$), sodium oxide ($Na_2O$), barium oxide (BaO), calcium oxide (CaO), magnesium oxide (MgO), and the like, or an organic metallic oxide, phosphorus pentoxide ($P_2O_5$), and the like. The metallic salt may be, for example, a sulfate, such as lithium sulfate ($Li_2SO_4$), sodium sulfate ($Na_2SO_4$), calcium sulfate ($CaSO_4$), magnesium sulfate ($MgSO_4$), cobalt sulfate ($CoSO_4$), gallium sulfate ($Ga_2(SO_4)_3$), titanium sulfate ($Ti(SO_4)_2$), nickel sulfate ($NiSO_4$), and the like, a metallic halide, such as calcium chloride ($CaCl_2$), magnesium chloride ($MgCl_2$), strontium chloride ($SrCl_2$), yttrium chloride ($YCl_3$), copper chloride ($CuCl_2$), cesium fluoride (CsF), tantalum fluoride ($TaF_5$), niobium fluoride ($NbF_5$), lithium bromide (LiBr), calcium bromide ($CaBr_2$), cesium bromide ($CeBr_3$), selenium bromide ($SeBr_4$), vanadium bromide ($VBr_3$), magnesium bromide ($MgBr_2$), barium iodide ($BaI_2$), magnesium iodide ($MgI_2$), and the like; or a metallic chlorate, such as barium perchlorate ($Ba(ClO_4)_2$), magnesium perchlorate ($Mg(ClO_4)_2$), and the like, but is not limited thereto. In an example, the moisture absorbent may be a metallic oxide, but is not limited thereto.

The moisture absorbent may have, for example, a shape such as a globular shape, an oval shape, a polygonal shape, an amorphous shape, and the like. In addition, the moisture absorbent may have, for example, a mean diameter of about 1 to about 20 μm, about 1 to about 15 μm, about 1 to about 10 μm, or about 1 to 7 μm. Within the range of the above-mentioned diameter, it can be possible to properly block or remove moisture, smoothly perform the encapsulating process, and avoid damaging the OED in the encapsulating process or after the encapsulating process.

The moisture absorbent may be mixed with the composition after performing proper processing. For example, the diameter of the moisture absorbent may be controlled by applying a grinding process before mixing it to the adhesive composition. In order to grind the moisture absorbent, a three-roll mill, a bead mill or a ball mill, and the like may be used, for example. In addition, when the adhesive composition is used to encapsulate a top emission-type device, and the like, a size of the moisture absorbent may be controlled to be smaller in size, considering the transmittance of an adhesive.

The adhesive composition may include 1 to 100 parts by weight, 1 to 90 parts by weight, 1 to 80 parts by weight, 1 to 70 parts by weight, 1 to 60 parts by weight, 1 to 50 parts by weight, 1 to 40 parts by weight, 5 to 40 parts by weight, 10 to 40 parts by weight, or 15 to 40 parts by weight of the moisture absorbent, relative to 100 parts by weight of the curable adhesive resin. It can be possible to allow the curing material to have an excellent moisture and humidity blocking property by controlling the content of the moisture absorbent to at least 1 part by weight. Also, the content of the moisture absorbent is controlled to be less than 100 parts by weight so that it can be possible to allow the encapsulant layer to be thin and also to have an excellent moisture blocking property.

In the present specification, a unit, parts by weight, refers to a weight ratio, unless otherwise specified.

Also, the adhesive composition further includes a filler. The filler may be, for example, an inorganic filler. The filler may be used in a proper ratio to lengthen a route through moisture or humidity penetrating the encapsulation structure, thereby suppressing the penetration of moisture or humidity. In addition, the filler can maximize a blocking property to moisture and humidity through an interaction with the moisture absorbent and a crosslinking structure of the curable adhesive resin.

The filler may be, for example, at least one or two of clay such as nano clay, silica such as talc, needle silica, alumina, titania, and the like. In an example, the filler may be the nano clay, talc or needle silica, and the like.

In an example of the present invention, the filler may be the clay, such as the nano clay, and the like.

The clay may be, for example, natural or synthetic clay; and an organoclay, which is an organically modified clay.

The natural or synthetic clay may be, for example, mica, fluoromica, pyrophyllite, glauconite, vermiculite, sepiolite, allophone, imogolite, talc, illite, sobockite, svinfordite, kaolinite, dickite, nacrite, anauxite, sericite, ledikite, montronite, metahalloysite, serpentine clay, chrysotile, antigorite, attapulgite, palygorskite, Kibushi clay, gairome clay, hisingerite, chlorite, montmorillonite, sodium montmorillonite, magnesium montmorillonite, calcium montmorillonite, nontronite, bentonite, beidellite, hectorite, sodium hectorite, saponite, sauconite, fluorohectorite, stevensite, volkonskoite, magadiite, kenyaite, halloysite, hydrotalcite, smectite, smectite-type clay, and the like, but is not limited thereto. The phyllosilicate as mentioned above may be obtained in a natural state in nature, or synthesized using a known method.

In an example, the clay may be the organically modified organoclay. The organoclay refers to the smectite or smectite-type clay prepared by interacting between unfunctionalized clay and at least one intercalant. In this situation, the type of the intercalant used may generally be a neutral or ionic organic compound. Examples of the neutral organic compound may include a monomeric, oligomeric, or polymeric compound of a polar compound, such as an amide, ester, lactam, nitrile, urea, carbonate, phosphate, sulfate, sulfonate, or nitro compound. The neutral organic compound may be inserted between layers of clay through a hydrogen bond, not completely replacing a charge-balancing ion of clay. In addition, examples of the ionic organic compound may include a cationic surfactant, such as an onium compound, such as ammonium (primary, secondary, tertiary or quaternary), phosphonium, sulfonium derivatives, an aromatic or aliphatic amine, phosphine and sulfide, and the like; and an onium ion of quaternary ammonium ion, and the like having at least one long chain aliphatic group (ex. octadecyl, myristyl, or oleyl) that is bound with a quaternary nitrogen atom. The organoclay may be one already in circulation under a brand name, such as CLOISITE (available from Southern Clay Products; derived from a layered magnesium aluminum silicate), CLAYTONE (available from Southern Clay Products; derived from a natural sodium bentonite), NANOMER (available from Nanocor), and the like.

The filler may have, for example, a shape such as a globular shape, an oval shape, a polygonal shape, an amorphous shape, and the like, but is not specifically limited thereto.

In addition, the filler may be subjected to a proper grinding process before being mixed into the adhesive composition, as in the case of the moisture absorbent.

The filler may be a product that is surface-treated with an organic material in order to increase binding efficiency with other organic materials in a composition, such as a curable adhesive resin, for example.

The adhesive composition may include about 1 to about 50 parts by weight, about 1 to about 40 parts by weight, about 1 to about 30 parts by weight, about 1 to about 20 parts by weight, or about 1 to about 15 parts by weight of the filler, relative to 100 parts by weight of the curable adhesive resin. It can be possible to provide the curing material with excellent moisture and humidity blocking property, and mechanical physical property by using 1 part by weight or more of the filler. In addition, it can be possible to provide the curing material to allow an adhesive to have a film or sheet type and also allow the adhesive to exhibit an excellent moisture blocking property even though the adhesive has a thin thickness as stated below by controlling the content of the filler to be 50 parts by weight or less.

Also, the adhesive composition may further include an initiator that can start a curing reaction of the resin or a curing agent that can form a crosslinking structure and the like by reacting with the curable adhesive resin according to the type of the curable adhesive resin.

The curing agent may be properly selected and used according to the curable adhesive resin or the type of a functional group that is included in the resin.

In an example, when the curable adhesive resin is an epoxy resin, the curing agent may be an epoxy resin curing agent that is known in the related art, for example, at least one of an amine curing agent, an imidazole curing agent, a phenol curing agent, a phosphorus curing agent, an acid anhydride curing agent, and the like, but is not limited thereto.

In an example, the curing agent may be an imidazole compound that is in a solid phase at room temperature, and has a melting point or degradation temperature of at least 80° C. The compound may be, for example, 2-methyl imidazole, 2-heptadecyl imidazole, 2-phenyl imidazole, 2-phenyl-4-methyl imidazole, 1-cyanoethyl-2-phenyl imidazole, and the like, but is not limited thereto.

The content of the curing agent may be selected the components of the composition, for example, according to a rate or type of the curable adhesive resin. The curing agent may be included in amounts of 1 to 20 parts by weight, 1 to 10 parts by weight, or 1 to 5 parts by weight, relative to 100 parts by weight of the curable adhesive resin. However, the weight ratio may be changed according to a type of the curable adhesive resin or a ratio and a type of the functional group of the resin or a crosslinking density to be implemented.

When the curable adhesive resin is an epoxy resin that is curable by irradiating active energy rays, the initiator may be, for example, a cationic photopolymerization initiator.

The cationic photopolymerization initiator may be an onium salt or organometallic salt ionized cationic initiator or an organic silane or latent sulfonic acid or non-ionized cationic photopolymerization initiator. The onium saltinitiator may be, for example, diaryliodonium salt, triarylsulfonium salt, aryldiazonium salt, and the like. The organometallic salt initiator may be, for example, iron arene, and the like; the organic silane initiator may be, for example, o-nitrobenzyl triaryl silyl ether, triaryl silyl peroxide, acyl silane, and the like; and the latent sulfonic acid initiator may be, for example, α-sulfonyloxy ketone, α-hydroxymethylbenzoin sulfonate, and the like, but these are not limited thereto.

The cationic initiator may be preferably an ionized cationic photopolymerization-initiator, more preferably an onium salt ionized cationic photopolymerization initiator, and most preferably an aromatic sulfonium salt ionized cationic photopolymerization-initiator such as triarylsulfonium salt, but is not limited thereto.

The content of the initiator may be changed according to a type of the curable adhesive resin or a ratio or a type of functional group of the resin, a crosslinking density to be implemented, and the like, as in the case of the curing agent. For example, the initiator may be mixed in a ratio of 0.01 to 10 parts by weight or 0.1 to 3 parts by weight, relative to 100 parts by weight of the curable adhesive resin. When the content of the initiator is excessively low, there is a risk that the curing will not progress sufficiently, and when it is excessively high, the content of the ionic material is increased after curing, which decreases durability of the adhesive, a conjugate acid is produced due to a property of the initiator, which decreases optical durability, or corrosion may occur on the substrate, the proper content range may be selected in consideration of the above aspects.

The adhesive composition may further include a binder resin. The binder resin may play a role in improving moldability when the adhesive composition is molded in a film or sheet shape.

A type of the binder resin is not particularly limited as long as it has compatibility with other components, such as the curable adhesive resin, and the like. The binder resin may be a phenoxy resin, an acrylate resin or a high molecular weight epoxy resin. The high molecular weight epoxy resin may, for example refer to a resin having a weight average molecular weight of about 2,000 to 70,000. The high molecular weight epoxy resin may be, for example, a solid bisphenol A-type epoxy resin, a solid bisphenol F-type epoxy resin, and the like. The binder resin may also be a rubber component, such as a high polarity functional group-containing rubber, a high polarity functional group-containing reactive rubber, and the like. In an example, the binder resin may be a phenoxy resin.

When the binder resin is included, its ratio may be controlled according to a desired physical property, and is not particularly limited. For example, the binder resin may be included in an amount of about 200 parts by weight or less, about 150 parts by weight or less, or about 100 parts by weight or less, relative to 100 parts by weight of the curable adhesive resin. When the ratio of the binder resin is less than 200 parts by weight, compatibility with each component of the adhesive composition may be effectively maintained and a role as an adhesive may be conducted.

Also, the adhesive composition may further include an additive agent, such as a plasticizer; a UV stabilizer, and/or an antioxidant, within the range that does not affect a desired effect.

Also, the present invention relates to an adhesive film. The adhesive film may have an adhesive layer including the above-mentioned adhesive composition. The adhesive layer may also have a film or sheet shape. The adhesive layer may be used for encapsulating the OED.

The adhesive film may further include a substrate film or a release film (hereinafter called a "first film"), and may have a structure in which the adhesive layer is formed on the substrate or release film. The structure may further include a release film or a substrate formed on the adhesive layer (hereinafter called a "second film").

FIG. 1 and FIG. 2 are cross-sectional diagrams of the exemplified adhesive film.

An adhesive film (1) may include an adhesive layer (11) formed on a substrate or release film (12), as shown in FIG. 1. Another exemplified adhesive film (2) may further include a substrate or release film (21) formed on the adhesive layer (11), as shown in FIG. 2. Although not shown in FIG. the adhesive film has the adhesive composition without a supporting substrate, such as the substrate or release film, so that it may have a structure including only the adhesive layer in a film or sheet shape that maintains a solid or semi-solid phase at room temperature or may have a structure having the adhesive layers formed on both sides of one substrate or release film.

A exemplified type of the first film is not particularly limited. The first film may be, for example, a plastic film. The first film may be, for example, a polyethylene terephthalate film, a polytetrafluoroethylene film, a polyethylene film, a polypropylene film, a polybutene film, a polybutadiene film, a vinyl chloride copolymer film, a polyurethane film, an ethylene-vinyl acetate film, an ethylene-propylene copolymer film, an ethylene-acrylic acid ethyl copolymer film, an ethylene-acrylic acid methyl copolymer film, a polyimide film, and the like.

When the first film is a release film, a proper release treatment may be performed on one side or both sides of the plastic film as mentioned above. A releasing agent used for the release treatment may be, for example, an alkyd releasing agent, a silicon releasing agent, a fluorine releasing agent, an unsaturated ester releasing agent, a polyolefin releasing agent or a wax releasing agent, and the like. In consideration of a heat resistance, and the like, the alkyd releasing agent, the silicon releasing agent or the fluorine releasing agent, and the like may be generally used among these, but the releasing agent is not limited thereto.

The first film may be, for example, a plastic film, in which a gas barrier layer is formed on the surface or side of the substrate. The film may be used for implementing a flexible device by directly constituting a substrate of the OED, for example.

Also, a type of the second film also is not particularly limited. For example, the second film may be the same as the first film or have a different type from the first film within the exemplified range of the above-mentioned first film.

Neither a thickness of the first film nor a thickness of the second film is particularly limited. In an example, a thickness of the first film may be about 50 to 500 μm or 100 to 200 μm. Within the above range, a process of manufacturing the adhesive or OED may be effectively automated, and also has an advantage in terms of economic feasibility.

Also, the thickness of the second film also is not particularly limited. For example, the thickness of the second film may be the same as that of the first film, or may be controlled to be relatively thinner or thicker than the first film.

The adhesive layer of the adhesive film includes the adhesive composition and has a film or sheet shape. The adhesive layer includes a curable adhesive resin that is in a solid phase or semi-solid phase at room temperature so that it may be in a solid phase or semi-solid phase at room temperature too. The curable adhesive resin that is included in the adhesive layer of the solid phase or semi-solid phase may be in a non-cured state. The adhesive resin may form a crosslinking structure when the encapsulation structure of the OED is cured as will be described below.

The thickness of the adhesive layer is not particularly limited and may be properly selected in consideration of the use. For example, the adhesive layer may have a thickness of 5 to 200 μm. The thickness of the adhesive layer may be controlled in consideration of a filling property, processability, economic feasibility, and the like, for example when used as an encapsulating material of the OED.

Also, the present invention relates to a method of manufacturing an adhesive film. An exemplified adhesive film may be formed by molding the adhesive composition in a film or sheet shape.

In an example, the method may include applying a coating solution containing the adhesive composition on a substrate or release film in a sheet or film shape, and drying the applied coating solution. The manufacturing method may also include adhering an additional substrate or release film on the dried coating solution.

The coating solution containing the adhesive composition may be prepared by dissolving or distributing each above-mentioned component of the adhesive composition in a proper solvent, for example. In an example, the adhesive composition may be prepared by a method including dissolving or distributing the moisture absorbent or filler in a solvent, grinding the dissolved or distributed moisture absorbent or filler, and then mixing the ground moisture absorbent or filler with a curable adhesive resin. In the above process, a ratio of the moisture absorbent, the filler, or the curable adhesive resin may be controlled according to a desired moisture blocking property and film moldability within the above-mentioned range, for example. When the coating solution includes a binder resin, a ratio of the binder resin may also be controlled in consideration of the film moldability, impact resistance, and the like. A molecular weight and a ratio of the binder resin, a type and a ratio of the solvent, and the like may be controlled in consideration of the moldability, viscosity of the coating solution, and the like, as required.

The grinding of the moisture absorbent or filler may be performed by dissolving or distributing all of them in the same solvent, or may be performed by separately distributing each of them in different solvents. The grinding may be performed using only one of a ball mill, a bead mill, a three-roll, or a high-speed grinder, or using a combination thereof. The material for the balls or beads may be, for example, glass, alumina or zirconium, and the like, and the balls or beads prepared with zirconium as the material are preferable in terms of dispersibility of particles.

The type of a solvent used to prepare the coating solution is not particularly limited. However, when a time for drying the solvent becomes excessively long or the drying should be dried at a high temperature, there may be a problem in terms of workability or durability of the adhesive film, and thus a solvent having a volatile temperature of 100° C. or less may be used. A solvent having a volatile temperature of at least the above-mentioned range may be mixed in small quantity, and then used in consideration of the film moldability, and the like. The solvent may be, for example, more than one or two of methylethylketone (MEK), acetone, toluene, dimethylformamide (DMF), methylcellosolve (MCS), tetrahydrofuran (THF), N-methylpyrrolidone (NMP), and the like, but is not limited thereto.

The method of applying the coating solution on the substrate or release film is not particularly limited, but for example, a known coating method, such as a knife coat, a roll coat, a spray coat, a gravure coat, a curtain coat, a comma coat, a lip coat, and the like, may be used.

The applied coating solution may be dried to volatilize the solvent and form the adhesive layer. The drying may be performed at a temperature of 70 to 150° C. for 1 to 10 minutes. Conditions of the drying may be changed in consideration of the type or ratio of the solvent used or curability of the curable adhesive resin.

Following the drying, an additional substrate or release film may be formed on the adhesive layer. For example, the forming of the substrate or release film may be performed by pressing the film on the adhesive layer using a hot roll lamination or press process. The hot roll lamination process may be used in terms of a possibility of continuous processing and efficiency. When performing the above process, the temperature may be about 10° C. to 100° C. and the pressure may be about 0.1 kgf/cm$^2$ to 10 kgf/cm$^2$, but these are not limited thereto.

Also, the present invention relates to an OED. The OED may include a substrate; an organic electronic element formed on the substrate; and an encapsulant layer that covers the entire surface of the organic electronic element and includes the adhesive composition in a cured state. The OED may further include a cover substrate that is formed on the upper side of the encapsulant layer.

The organic electronic element may be, for example, an OLED.

Also, the organic electronic element may be manufactured using the adhesive film, for example.

The encapsulant layer may be formed as an adhesive layer for a structure that effectively fixes and supports the substrate and the cover substrate, while exhibiting an excellent moisture blocking property and optical property in the OED.

In addition, the encapsulant layer may exhibit excellent transparency so that it can be formed as a stable encapsulant layer regardless of a type of the OED such as a top emission or bottom emission mode.

FIG. 3 is a schematic diagram showing the OED, of which the organic electronic element is an OLED.

In order to manufacture the OED, for example, transparent electrodes are first formed on a glass or polymer film (31) used as a substrate using a method such as vacuum deposition or sputtering, and the like, a layer of a light-emitting organic material consisting of, for example, a hole transport layer, a light-emitting layer, an electron transport layer, and the like, is formed on the transparent electrodes, and an electrode layer is further formed thereon to manufacture an organic electronic element (32). Then, an adhesive layer of the adhesive film is disposed to cover the entire surface of the organic electronic element (32) of the substrate (31) that has undergone the above processes.

Then, the adhesive layer is pressed on the organic electronic element in state giving fluidity after heated by using a laminate device, and the like, and a curable adhesive resin in the adhesive layer is cured to form an encapsulant layer (33).

In an example, the adhesive layer to be disposed to cover the entire surface of the organic electronic element (32) may be transferred in advance to a cover substrate (34), such as a glass or polymer film. For example, a transfer of the adhesive layer to the cover substrate (34) may be performed while applying heat using a vacuum press, a vacuum laminator, and the like in the state of contacting the adhesive layer with the cover substrate (34) after delaminating a first or second film from the adhesive film. When the adhesive includes a heat curable adhesive resin and the curing reaction excessively occurs in the above process, it is possible that the contact force or the adhesion of the encapsulant layer (33) may be reduced so that the process temperature may be controlled at about 100° C. or less and the process time may be controlled within less than 5 minutes.

The cover substrate (34), to which the adhesive layer is transferred, may be positioned on the organic electronic element (32) and then a heat pressing process may be performed to form the encapsulant layer (33).

The adhesive layer may be cured to form the encapsulant layer (33). The curing may be performed in a proper heating chamber or ultraviolet ray chamber according to a curing method of the curable adhesive resin, for example. The heating conditions or the conditions of irradiating active energy rays may be properly selected in consideration of stability of the organic electronic element, a curing property of the adhesive resin, and the like.

One example of the method of manufacturing the OED has been mentioned above, but the OED may be manufactured using other methods. For example, the manufacturing of the device may be performed using the above-mentioned process, but with an order or conditions of the process changed. For example, the adhesive layer may not be transferred to the cover substrate (34) in advance, but may be first transferred to the organic electronic element (32) on the substrate (31), the cover substrate (34) may be laminated, and the curing may be performed to form the encapsulant layer (33).

In contrast to the conventional methods, the above-mentioned method does not require the use of a metal, a glass can, and the like, having a hole formed through etching, and the like, in order to install a getter, and the like, and thus the manufacturing process is simple and manufacturing cost can be reduced. In addition, the OED, which is manufactured regardless a design method of the OED, such as a top emission or bottom emission mode, can exhibit excellent mechanical durability along with excellent desired performance using the adhesive film.

An exemplified adhesive composition according to the present invention can provide an adhesive having an excellent adhesive property, impact resistance, a heat-protecting property, and a moisture blocking property, so that an OED manufactured using the adhesive composition can exhibit an excellent lifespan property and durability.

Advantageous Effects

An exemplified adhesive composition according to the present invention can provide an adhesive having an excellent adhesive property, impact resistance, a heat-protecting property, and a moisture blocking property, so that an OED manufactured using the adhesive composition can exhibit an excellent lifespan property and durability.

BEST MODES OF THE INVENTION

Hereinafter, the adhesive composition, and the like will be described in further detail with reference to the following Examples and Comparative Examples, but the range of the present invention is not limited to the following Examples.

Physical properties were evaluated using the following methods in Examples and Comparative Examples.

1. Evaluation of Adhesive Strength

Two sheets of 0.7 T glass plates were disposed at right angles so as to be in a T shape. An adhesive layer with a size of 5 mm×40 mm (width×length) that was manufactured from Examples or Comparative Examples was disposed on a contact site between the above two plates, and hot-pressed under a vacuum with a pressure of 2 kgf at 80° C. for 2 minutes, and then cured again at 100° C. for 3 hours. Then, strength at the point at which the adhered glass specimen having the T shape was separated by pressing one end side of the T-shaped glass specimen with a constant pressure using a tensile tester was measured, and the measured value was defined as an adhesive strength.

2. Calcium Test

Calcium (Ca) was deposited on a glass substrate in a size of 8 mm×8 mm×100 nm (width×length×thickness). Then, the adhesive layers manufactured from Examples and Comparative Examples were transferred to a cover glass, the cover glass was laminated on the calcium on the glass substrate to have a bezel of 3 mm, hot-pressed at 80° C. for 2 minutes using a vacuum press, and then cured at 100° C. for 3 hours to form an encapsulant layer and prepare a specimen. Then, while the specimen was maintained in a constant temperature and humidity chamber at 80° C. and 90% relative humidity, the time to change the end of the calcium deposition part to be transparent due to an oxidation was measured.

Example 1

Figure 1:
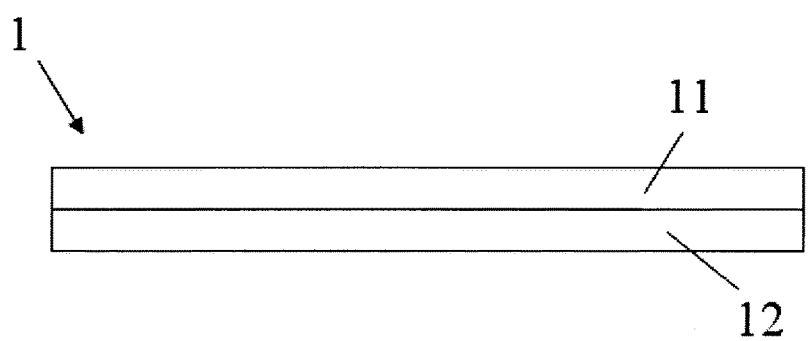
FIG. 1 and FIG. 2 are diagrams showing an exemplified adhesive film.
Figure 2:
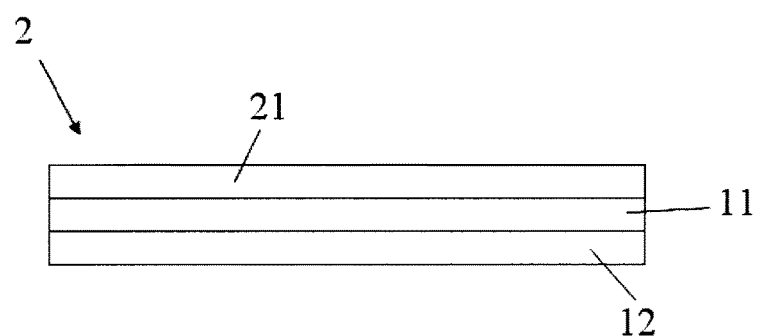
Figure 3:
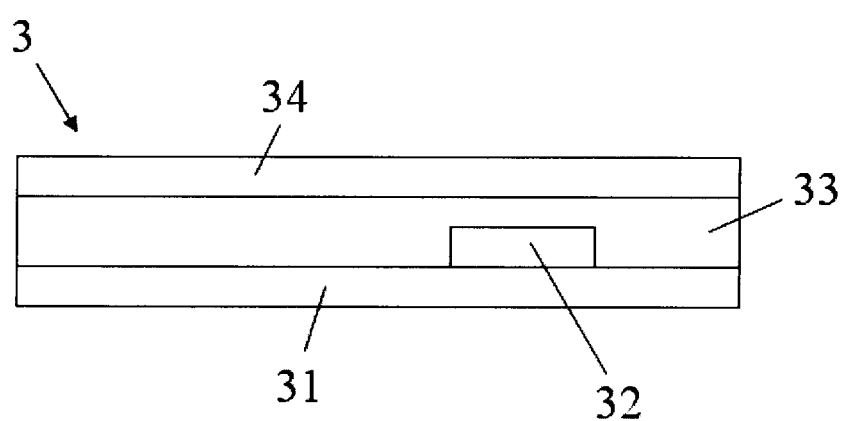
FIG. 3 is a diagram showing an exemplified organic electronic device.

70 g of CaO (available from Aldrich Co., Ltd.) as a moisture absorbent was added to methylethyl ketone at a concentration of 30 weight % to prepare a moisture absorbent solution. In addition, 18 g of nano clay (CLOISITE 93A, available from Southern Clay Products) as a filler was added to methylethyl ketone at a concentration of 30 weight % to prepare a filler solution. Then, each solution was introduced into a ball mill process and subjected to milling for about 24 hours. 200 g of a silane modified epoxy resin (KSR-177, available from KUKDO Chemical Co., Ltd.) and 150 g of a phenoxy resin (YP-50, available from Dongdo Chemicals Corporation) were added to a reactor at room temperature and diluted with methylethyl ketone to an appropriate concentration, nitrogen was replaced in the reactor, and then the solution was homogenized. The moisture absorbent and filler solution that went through the ball mill process were added to the homogenized solution, and 4 g of an imidazole curing agent (available from Shikoku Chemicals Corporation) was added, and stirred for 1 hour at a high speed. The stirred solution was filtered through a filter with a hole size of 20 μm, and then the filtered solution was applied on a release film with a thickness of 50 μm using a comma coater. The applied coating solution was dried in a drier at 120° C. for 5 minutes to form an adhesive layer that had a thickness of about 20 μm and maintained a solid phase at room temperature. The manufactured adhesive layer was laminated to a release film with the same material as in the release film using a laminator to manufacture an adhesive film with the structure as shown in FIG. 2.

Example 2

53 g of CaO (available from Aldrich Co., Ltd.) as a moisture absorbent was added to methylethyl ketone at a concentration of 30 weight % to prepare a moisture absorbent solution. In addition, 10 g of nano clay (CLOISITE 93A, available from Southern Clay Products) as a filler was added to methylethyl ketone at a concentration of 30 weight % to prepare a filler solution. Each solution was introduced into a ball mill process and subject to milling for about 24 hours. In addition, 200 g of a silane modified epoxy resin (KSR-177, available from KUKDO Chemical Co., Ltd.) and 150 g of a phenoxy resin (YP-50, available from Dongdo Chemicals Corporation) were added to a reactor at room temperature and diluted with methylethyl ketone; nitrogen was replaced in the reactor, and then the prepared solution was homogenized. The milled moisture absorbent and filler solution were added to the homogenized solution, and 4 g of an imidazole curing agent (available from Shikoku Chemicals Corporation) was added and stirred for 1 hour at a high speed. Then, the stirred solution was filtered through a filter having a hole size of 20 μm, and an adhesive film was obtained by the same method as in Example 1.

Comparative Example 1

An adhesive film was manufactured using the same method as in Example 1, except that the moisture absorbent and the filler solution were not added.

Comparative Example 2

An adhesive film was manufactured using the same method as in Comparative Example 1, except that as a moisture absorbent solution, a solution prepared by adding 70 g of CaO (available from Aldrich Co., Ltd.) to methylethyl ketone at a concentration of 30 weight % was milled in a ball mill process for about 24 hours, and then the solution was further added.

Comparative Example 3

An adhesive film was manufactured using the same method as in Comparative Example 1, except that as a filler solution, the solution prepared by adding 35 g of nano clay (CLOISITE 93A, available from Southern Clay Products) to methylethyl ketone at a concentration of 30 weight % was milled in a ball mill process for about 24 hours, and then the solution was further added.

The above-measured results were shown in the following Table 1:

TABLE 1

|  | Adhesive Strength (gf/cm²) | Ca test results |
|---|---|---|
| Example 1 | 600 | 400 hours |
| Example 2 | 700 | 340 hours |
| Comparative Example 1 | 350 | 24 hours |
| Comparative Example 2 | 400 | 260 hours |
| Comparative Example 3 | 700 | 120 hours |

As shown in the results of Table 1, Examples according to the present invention exhibited excellent adhesive strength to a glass plate. In addition, when deposited calcium was encapsulated, it was shown that it may effectively suppress an inflow of moisture, humidity, and the like from the outside.

However, Comparative Example 1 without the moisture absorbent and filler did not have an adhesive strength and did not block moisture. Also, for Comparative Example 2 without the filler, it was shown that an adhesive strength was greatly decreased and a moisture-blocking property was not satisfactory. In addition, for Comparative Example 3 without the moisture absorbent, the moisture blocking property was greatly decreased.

EXPLANATION OF MARKS 1, 2: Adhesive Film
11: Adhesive Layer
12: First Film
21: Second Film
3: OED
31: Substrate
32: Organic Electronic Element
33: Encapsulant Layer
34: Cover Substrate

The invention claimed is:

1. An adhesive film for encapsulating an entire surface of an organic electronic element, comprising an adhesive layer that is in a film or sheet shape and that comprises an adhesive composition, comprising:
    a curable adhesive resin;
    a moisture absorbent that is comprised in an amount of 1 to 100 parts by weight relative to 100 parts by weight of the adhesive resin;
    a filler that is comprised in an amount of 1 to 15 parts by weight relative to 100 parts by weight of the adhesive resin; and
    a binder resin,
    wherein the adhesive composition is in a solid or semi-solid phase at room temperature, and wherein the curable adhesive resin is an epoxy resin having a viscosity of $10^6$ poise or more at room temperature when the curable adhesive resin is in a non-cured state.

2. The adhesive film for encapsulating an entire surface of an organic electronic element of claim 1, wherein the curable adhesive resin is a silane modified epoxy resin.

3. The adhesive film for encapsulating an entire surface of an organic electronic element of claim 2, wherein the silane modified epoxy resin is an aromatic epoxy resin to which a silane compound of the following Chemical Formula 1 is introduced, the silane compound being introduced in an amount of 0.1 to 10 parts by weight, relative to 100 parts by weight of the aromatic epoxy resin:

$$D_nSiX_{(4-n)} \quad \text{[Chemical Formula 1]}$$

where, D is a vinyl group, an epoxy group, an amino group, an acrylic group, a methacrylic group, a mercapto group, an alkoxy group, or an isocyanate group, or an alkyl group substituted with any one of a vinyl group, an epoxy group, an amino group, an acrylic group, a methacrylic group, a mercapto group, an alkoxy group and an isocyanate group;

X is hydrogen, an alkyl group, a halogen, an alkoxy group, an aryl group, an aryloxy group, an acyloxy group, an alkylthio group, or an alkyleneoxythio group; and n is a number from 1 to 3.

4. The adhesive film for encapsulating an entire surface of an organic electronic element of claim 3, wherein the aromatic epoxy resin is a bisphenol epoxy resin.

5. The adhesive film for encapsulating an entire surface of an organic electronic element of claim 1, wherein the moisture absorbent is an oxide or metallic salt.

6. The adhesive film for encapsulating an entire surface of an organic electronic element of claim 1, wherein the filler is at least one selected from the group consisting of clay, talc, silica, alumina, and titania.

7. The adhesive film for encapsulating an entire surface of an organic electronic element of claim 1, wherein the filler is an organoclay.

8. The adhesive film for encapsulating an entire surface of an organic electronic element of claim 1, further comprising 1 to 20 parts by weight of a curing agent, relative to 100 parts by weight of the curable adhesive resin.

9. The adhesive film for encapsulating an entire surface of an organic electronic element of claim 8, wherein the curing agent is an imidazole compound which has a melting temperature or degradation temperature of at least 80° C., and which is in a solid phase at room temperature.

10. The adhesive film for encapsulating an entire surface of an organic electronic element of claim 1, further comprising 0.01 to 10 parts by weight of a cationic photopolymerization initiator, relative to 100 parts by weight of the curable adhesive resin.

11. A method of manufacturing an adhesive film, comprising forming an adhesive layer by molding the adhesive composition of claim 1 in a film or sheet shape.

12. The method of manufacturing an adhesive film of claim 11, wherein the adhesive composition is manufactured by dissolving or distributing the moisture absorbent or filler in a solvent; grinding the dissolved or distributed moisture absorbent and filler; and then mixing the ground moisture absorbent and filler with the curable adhesive resin.

13. An organic electronic device, comprising: a substrate; an organic electronic element formed on the substrate; and an encapsulant layer that is a cured state of the adhesive film of claim 1 and that covers the entire surface of the organic electronic element.

* * * * *